(12) United States Patent
Lombard et al.

(10) Patent No.: US 8,709,520 B2
(45) Date of Patent: *Apr. 29, 2014

(54) MEAT-CONTAINING, STRIP SHAPED FOOD PRODUCT AND METHOD OF MAKING SAME

(71) Applicant: Del Monte Corporation, San Francisco, CA (US)

(72) Inventors: Robert J. Lombard, Aurora, CO (US); Kenchu Tham, Sparta, NJ (US); Haitao Ni, Morris Plains, NJ (US); Paul Ziemba, Lancaster, NY (US); Harry Levine, Morris Plains, NJ (US)

(73) Assignee: Big Heart Pet Brands, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,972

(22) Filed: Oct. 16, 2012

(65) Prior Publication Data

US 2013/0040027 A1 Feb. 14, 2013

Related U.S. Application Data

(63) Continuation of application No. 11/863,031, filed on Sep. 27, 2007, now Pat. No. 8,309,157, which is a continuation of application No. 10/650,023, filed on Aug. 27, 2003, now Pat. No. 7,282,235.

(51) Int. Cl.
*A23L 1/315* (2006.01)

(52) U.S. Cl.
USPC ........... 426/513; 426/504; 426/518; 426/573; 426/575; 426/578; 426/646; 426/805

(58) Field of Classification Search
USPC ......... 426/646, 513, 805, 573, 575, 578, 504, 426/508
See application file for complete search history.

(56) References Cited

U.S. PATENT DOCUMENTS

| | | | |
|---|---|---|---|
| 4,534,990 | A | 8/1985 | Gellman et al. |
| 4,800,099 | A | 1/1989 | Gellman et al. |
| 4,822,626 | A | 4/1989 | Spanier et al. |
| 4,868,002 | A | 9/1989 | Scaglione et al. |

(Continued)

FOREIGN PATENT DOCUMENTS

JP 9-149757 6/1997

OTHER PUBLICATIONS

Rombauer et al., "Joy of Cooking", 1975, Bobbs-Merrill Co., Inc., pp. 487, 492, 493.

*Primary Examiner* — Helen F Heggestad
(74) *Attorney, Agent, or Firm* — Greenblum & Bernstein, P.L.C.

(57) ABSTRACT

A flexible, strip-shaped food product is made by comminuting substantially frozen meat, such as chicken, and heating the comminuted meat to at least partially denature the meat proteins and cooling the cooked meat. About 4% by weight to about 45% by weight of wheat flour is admixed with the cooked meat, with other ingredients, such as an alginate gum, to form a dough. The wheat flour unexpectedly increases tensile strength of the dough and products baked from the dough, and maintains flexibility of the strip-shaped food products over an extended period of time. Cooking of the meat in the presence of salt unexpectedly increases water activity of the pieces, resulting in a product that has a skin and moist middle, while maintaining tensile strength. The dough is rotary-molded into strip-shaped pieces. The rotary mold may have angled die cups. The strip-shaped dough pieces are then baked and dried.

28 Claims, 4 Drawing Sheets

(56) References Cited

U.S. PATENT DOCUMENTS

| | | |
|---|---|---|
| 4,883,421 A | 11/1989 | Morgan |
| 4,904,495 A | 2/1990 | Spanier |
| 4,997,671 A | 3/1991 | Spanier |
| 5,045,339 A | 9/1991 | Ducharme |
| 5,094,870 A | 3/1992 | Seaglion et al. |
| 5,114,704 A | 5/1992 | Spanier et al. |
| 5,283,077 A | 2/1994 | Ray |
| 5,290,584 A | 3/1994 | Ray |
| 5,405,836 A | 4/1995 | Richard et al. |
| 5,532,010 A | 7/1996 | Spanier et al. |
| 5,552,176 A | 9/1996 | Marino |
| 5,731,029 A | 3/1998 | Karwowski et al. |
| 5,773,070 A | 6/1998 | Kazemzadeh |
| 5,922,692 A | 7/1999 | Marino |
| 6,238,726 B1 | 5/2001 | Fischer |
| 6,410,079 B2 | 6/2002 | Cheuk et al. |
| 6,652,892 B2 | 11/2003 | McGenity et al. |
| 7,282,235 B2 | 10/2007 | Lombard et al. |
| 8,309,157 B2 | 11/2012 | Lombard et al. |
| 2002/0119241 A1 | 8/2002 | Speck et al. |
| 2008/0020117 A1 | 1/2008 | Lombard et al. |

MEAT-CONTAINING, STRIP SHAPED FOOD PRODUCT AND METHOD OF MAKING SAME

RELATED APPLICATIONS

This application is a continuation of U.S. application Ser. No. 11/863,031, filed Sep. 27, 2007, now U.S. Pat. No. 8,309,157, which is a continuation of U.S. application Ser. No. 10/650,023 filed Aug. 27, 2003, now U.S. Pat. No. 7,282,235, the disclosures of which are herein each incorporated by reference in their entireties.

FIELD OF THE INVENTION

The present invention is directed to meat-containing, strip-shaped food products and methods of making such products.

BACKGROUND OF THE INVENTION

Naturally prepared jerky products are generally made with cut strips of striate muscle meat. However, the process is time consuming and the finished thickness of the jerky is established by the initial cutting of the meat.

Jerky products may also be produced from a ground meat composition that is solidified to provide a loaf or sheet which can be cut into individual strips. As disclosed in U.S. Pat. No. 4,883,421 to Morgan and U.S. Pat. No. 4,868,002 to Scaglione et al., extruders may be used to form ground beef compositions into a loaf or strip. The solidifying may be by freezing or other solidifying means such as drying, cooking, or combinations thereof with freezing.

Combining raw, frozen, or chilled comminuted meats and other similar meat products with farinaceous material components to form an expanded snack product or a flat strip of jerky-like product using a high-temperature, short-time food extruder is disclosed in U.S. Pat. No. 5,290,584 to Ray. The jerky-like product has a starch content of about 40% to 80% by weight prior to extrusion and a protein content of about 17-20% in the extrudate.

U.S. Pat. Nos. 4,904,495 and 4,997,671, both to Spanier, disclose a dog snack that includes 12 to about 30% by weight of gelatin; at least one acidulant; at least one cereal starch-containing agent; at least one release agent; at least one taste agent; at least one sugar; salt and water. Some of the gelatin may be replaced with 0.01 to 8% by weight of wheat gluten. The cereal starch-containing agent may be about 5-20% by weight of wheat starch. The taste agent is about 10 to about 30% by weight of beef, liver, or poultry meat meal or powder. The dog food is in molded form.

U.S. Pat. No. 4,800,099 to Gellman et al. discloses a canine biscuit that contains meat and a farinaceous material. A preferred biscuit dough contains about 50-60% by weight of wheat flour; about 5-10% by weight of soybean meal; about 3-20% by weight of meat and bone meal; about 1-5% by weight of wheat meal; about 1-5% by weight of animal fat; and about 20-30% by weight of water. The dough may be sheeted followed by rotary molding.

U.S. Pat. No. 5,731,029 to Karwowski et al. discloses a jerky product containing meat. Frozen meat is comminuted and then heated. The cooked meat is then cooled. A binding agent is added to the cooked meat. The binding agent may be 1-20% by weight of a starch, such as wheat starch, and guar gum. The binding agent is mixed with the cooked meat and seasonings and fillers to obtain a dough. The filler may be wheat germ or wheat gluten. The meat-based dough may be rotary molded to form pieces. The moldable compositions may comprise at least about 50% by weight of meat based upon the weight of the dough. The water activity or relative humidity of the jerky product is less than about 0.85.

As the length of a food product increases and its width and thickness decrease, the food product becomes more susceptible to breakage. The thin, strip-shaped food products of the present invention are flexible, have reduced breakage during and after packaging, and have a high meat content. The high meat content increases palatability in comparison to extruded food products. In addition, the strip-shaped food products have a soft, moist texture over time. Angled die cups may be used in the production of the strip-shaped products of the present invention. The angled die cups allow for less strain on the dough strip during rotary molding. The dough strip is lifted from a corner or end of the strip and peeled off of the die roll rather than being removed longitudinally which may cause a large bend to occur. Thus, the angled die cups allow for easier extraction of the food products from the die cavities.

SUMMARY OF THE INVENTION

The strength and flexibility of strip-shaped, high meat content food products are unexpectedly increased by the inclusion of wheat flour. The flexibility is maintained over a period of about 3 to about 4 months during which opposing ends of a strip may be bent to touch one another without breaking the strip. According to the present invention, meat that is at least substantially frozen or non-frozen is comminuted. The comminuted meat is heated to at least partially denature the meat proteins and melt the fat which is a part of the meat. The cooked meat is then cooled to remove water and to at least partially solidify the melted fat.

At least one binding agent is admixed with the cooked meat. The binding agent, as well as other ingredients such as seasoning, flavorants, humectants, preservatives, fillers, and the like, may be admixed with the cooked meat to obtain a dough or dough-like composition. The meat content of the dough may be about 35% by weight to about 75% by weight, based upon the weight of the dough. Admixing of the cooked meat with the ingredients may be conducted during cooling of the cooked meat or after cooling of the cooked meat.

According to the present invention, about 4% by weight to about 45% by weight of wheat flour, based upon the weight of the dough, is added to the cooked meat. The addition of wheat flour results in the formation of a gluten network, which allows for the formation of strip-shaped products with better strength and integrity. The addition of the wheat flour results in an unexpectedly flexible, strong, strip-shaped food product having reduced breakage both during formation and during packaging, thereby eliminating product waste and reducing costs.

After cooling, the dough may be formed into pieces. Formation of the pieces is preferably by sheeting the dough prior to rotary molding. The high meat content of the rotary-molded pieces increases palatability in comparison to extruded food products. The molded pieces may then be conveyed to an oven or dryer or a combination thereof for reducing the moisture content of the pieces. Salt may be added during cooking of the comminuted meat, instead of in a preblend with other dry ingredients to meat that has already been cooked, to substantially increase the water activity of the food products without substantially reducing the tensile strength of the food products. The water activity may be increased while providing enough baking time to set the product structure in which a skin is formed around a moist middle or core and while also maintaining tensile strength.

The water activity of the final food product may be less than about 0.8, preferably less than about 0.75, and generally from about 0.65 to about 0.75.

DETAILED DESCRIPTION OF THE INVENTION

Figure 1:
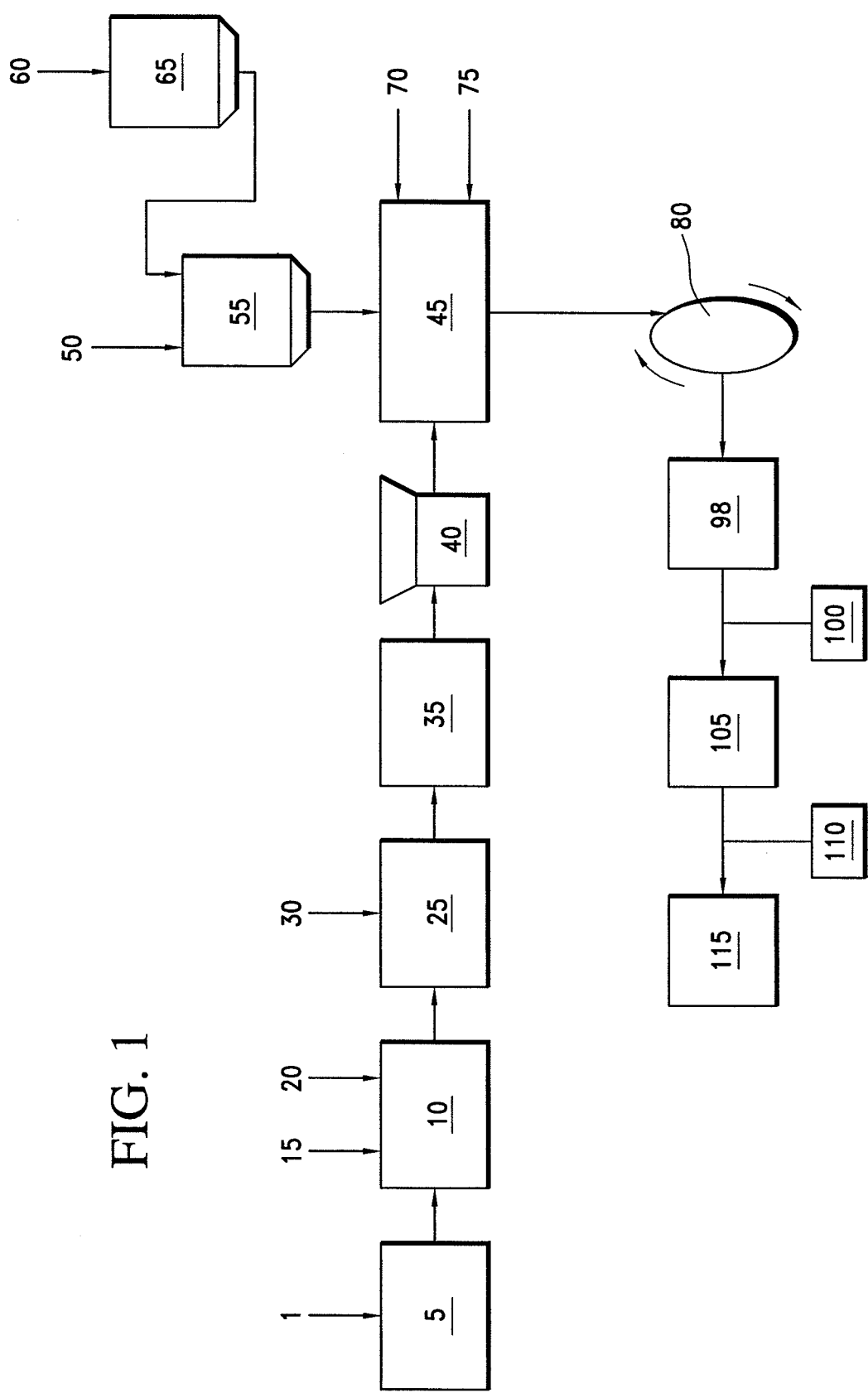
FIG. 1 schematically shows an embodiment for making a rotary-molded, strip-shaped food product according to the present invention.

The strip-shaped, rotary-molded food products of the present invention are flexible, have reduced breakage during and after packaging, and have a high meat content, which substantially increases palatability in comparison to extruded food products. In addition, the thin, strip-shaped food products have a soft, moist texture which is maintained over an extended period of time. Unexpectedly superior tensile strength and flexibility are achieved by the inclusion of wheat flour in the composition. Also, cooking of the meat in the presence of salt unexpectedly produces a high water activity and moisture content while maintaining a high tensile strength in the rotary-molded dough and the baked product. Angled die cups may be used in the production of the strip-shaped products of the present invention to allow for easier extraction with substantially reduced deformation of the food products from the die cavities. The angle of a die cup may be measured between a tangent line from a front portion of a longitudinal leading edge to a trailing portion of the longitudinal leading edge of the die cup relative to an outer surface line that is parallel to a central longitudinal axis of the rotary molding die roll or to a transverse axis of a conveyor belt upon which a strip is deposited from the die cup. The rotary molded strip-shaped products of the present invention may be produced as a straight strip or as a wavy or undulating strip.

I. Meat-Based Dough Composition

A meat-based dough containing meat, wheat flour, and other ingredients is made according to the present invention. The ingredients that may be employed to obtain the meat-based dough of the present invention are:

A. Meat

Raw meat is preferably provided in at least substantially frozen form to avoid microbial spoilage prior to processing. Unlike meat meal, raw meat has a high moisture content, a high fat content, and the protein is not denatured. To rotary mold the raw meat on a continuous basis, the raw meat must be cooked to at least partially denature the protein and the fat must be resolidified to prevent slipping out of the rotary mold cavities. Cooking of the raw meat aids stability. The use of raw meat provides a strong meat flavor.

In embodiments of the present invention, the amount of raw meat used may be at about 35% to about 75% by weight, preferably about 35% to about 60% by weight, and more preferably about 40% to about 55% by weight, based upon the weight of the dough. Higher or lower levels of meat may be employed depending upon the level of sugar or humectant utilized. The moisture content of the raw meat is generally at least about 50% by weight, and most often from about 65% by weight to about 75% by weight, based upon the weight of the raw meat.

In one embodiment according to the present invention, the dough for making jerky strips may have about 54% by weight raw meat (about 27% by weight beef and about 27% by weight chicken meat) based upon the weight of the dough. In another embodiment, the dough may have about 43% by weight of chicken meat based upon the weight of the dough. Meat meal and bone meal may optionally be used in combination with the meat or meat by-products according to the present invention. Exemplary amounts of meat meal and bone meal which may be used range up to about 25% by weight, based upon the weight of the dough.

The raw meat used in the present invention may be any edible meat suitable for human consumption or pet consumption. The meat may be non-rendered, non-dried, raw meat, raw meat products, raw meat by-products, and mixtures thereof. Whole meat pieces and comminuted or ground meat may be used in embodiments of the present invention. The meat or meat products are generally supplied daily in a completely frozen or at least substantially frozen condition so as to avoid microbial spoilage. While refrigerated or chilled meat may be used, it is generally impractical to store large quantities of unfrozen meat for extended periods of time at a plant site.

The term "meat" is understood to apply not only to the flesh of cattle, swine, sheep, and goats, but also horses, whales and other mammals, poultry, and fish. The term "meat by-products" is intended to refer to those parts of the carcass of slaughtered animals including, but not restricted to, mammals, poultry and the like and including such constituents embraced by the term "meat by-products" in the Definitions of Feed Ingredients published by the Association of American Feed Control Officials, Incorporated (AAFCO). Likewise, the term "meat meal" refers to the finely ground, dry rendered residue from animal tissues including those dried residues embraced by the term in the official definition of the AAFCO. The terms "meat", "meat by-products", and "meat meal" are understood to apply to all of those animal, poultry, and marine products defined by the AAFCO.

Examples of meat that may be used are beef, veal, pork, and horse, and the fleshy tissue from antelope, bison, cows, deer, elk, and the like. Poultry meat that may be used includes chicken, turkey, duck, or goose, and the like. Embodiments of the present invention may also utilize the flesh of fish and shell fish. Beef, chicken, and turkey are preferred meats for making jerky products intended for human consumption. For jerky products intended as pet snacks, muscle meat, mechanically deboned beef, emulsified beef, mechanically deboned chicken, and emulsified chicken are preferred. Mechanically separated meat, when combined with wheat flour, provides an aesthetically-pleasing smooth surface in the final strip-shaped food products.

B. Binding Agent

The meat-based dough compositions of the present invention include a binding agent. A preferred binding agent is a combination of a starch and a gum, most preferably a cold-water-soluble starch and guar gum.

Starches that may be used as a binding agent include ungelatinized starches, pregelatinized starches, and modified starches. Waxy starches or high amylose content starches which are either ungelatinized or pregelatinized may be used. Exemplary starches are wheat starch, corn starch, potato starch, rice starch, sorghum starch, tapioca starch, waxy corn starch, waxy rice starch, mixtures thereof, and the like. The starches may be subjected to either physical and/or chemical modification.

Exemplary preferred starch materials which may be used are cold-water-soluble granular starch materials. The production of cold-water-soluble granular starch materials is described in U.S. Pat. No. 4,465,702 to Eastman et al., which is incorporated by reference in its entirety. A cold-water-swelling, granular starch for use in the present invention is MIRAGEL® 463, which is manufactured by the A. E. Staley Manufacturing Company. This starch is derived from corn starch. Unlike a typical pregelatinized starch which microscopically reveals particles that are swollen, fragmented and generally flake-like in shape, MIRAGEL® 463 particles appear as whole, regular granules. MIRAGEL® 463 thickens and sets to a gel using room temperature water. Setting of the gel typically occurs in half an hour at room temperature and the gel strength exceeds that of conventional, cooked, common corn starches.

Edible gums that may be employed as a binding agent include hydrocolloid gums such as alginate gum, guar gum, locust bean gum, xanthan gum, gum arabic, gum tragacanth, carrageenans, and combinations thereof. The gums absorb moisture from the meat, help to increase dough viscosity, reduce stickiness, and provide cohesiveness to the dough. Guar gum is a preferred gum for use in the present invention.

The amount of binding agent will depend on a number of factors including, but not limited to, the amount and type of meat used; the temperature to which the meat is cooked or the extent to which the protein is extracted; the amount of moisture present in the dough; and the particular binding agent. The amount of the binding agent should be sufficient to bind water inherent in the meat and any added water so as to provide a cohesive, sheetable, rotary-moldable, meat-based dough. Exemplary amounts of the binding agent may range up to about 25% by weight of the meat-based dough, for example, from about 0.5% to about 3% by weight of a gum and from about 2% by weight to about 20% by weight of a starch, based upon the weight of the meat-based dough. For example, about 1% to about 20% by weight, based upon the weight of the dough, of a cold-water-soluble starch may be admixed with the cooked meat.

C. Moisture Content of Dough

The moisture content of the dough will include moisture provided by the meat (which usually contains about 65% by weight to about 75% by weight moisture), and the moisture provided by dough additives or ingredients included in the formulation, such as high fructose corn syrup, invert syrups, or other liquid humectants. Taking into account all sources of moisture in the dough, including separately added water, the total initial moisture content of the dough is generally at least about 30% by weight, preferably from about 35% by weight to about 50% by weight, based upon the weight of the rotary moldable meat-based dough.

D. Wheat Flour

According to the present invention, about 4% by weight to about 45% by weight, preferably about 10% by weight to about 40% by weight, of wheat flour, based upon the weight of the dough, is included in the meat-based dough. In preferred embodiments, the amount of wheat flour employed may be about 30% by weight to about 38% by weight, based upon the weight of the dough. If too much wheat flour is added, a hard food product resembling a biscuit is obtained.

The addition of wheat flour results in the formation of a gluten network that has several beneficial results. The wheat flour allows for the formation of strip-shaped products with better strength and integrity, thereby resulting in pieces that are more readily extracted from a rotary mold die cavity. Wheat flour also results in reduced breakage of the rotary-molded food products during formation, packaging, and shipping or transport. The strip-shaped food products according to the present invention may have about 0.05% or less breakage during bulk packaging. Similarly, breakage in post-packaging may be substantially reduced to an average breakage per package of about 0.10% to about 0.50% in comparison to soy-based, strip-shaped products having 20-30% breakage. The final fully-dried, strip-shaped products according to the present invention are also unexpectedly flexible, having sufficient integrity to bend completely so that the strip ends touch each other without breaking of the strip. This flexibility of the strip-shaped food products may be maintained over a period of about 3 to about 4 months.

E. Salt

According to embodiments of the present invention, about 0.5% by weight to about 5% by weight of a salt, based upon the weight of the dough, may optionally be added prior to or during cooking of the meat, instead of in a preblend with other dry ingredients to meat that has already been cooked. The salt may be added at ambient temperature or may be cooled prior to adding to the meat. The salt may be sodium chloride or potassium chloride. In preferred embodiments, about 1% by weight to about 3% by weight of sodium chloride, based upon the weight of the dough, is used.

Salt addition during cooking of the meat causes additional meat proteins to become soluble, thereby increasing the water binding capacity of the dough. The salt addition during cooking of the meat increases the water activity of strip-shaped food products that do not contain wheat flour and strip-shaped food products made from a dough containing wheat flour. The increase in water activity of the strip-shaped food products is maintained over time, even when stored in bulk without moisture barrier protection. The increase in water activity caused by salt addition during cooking of the meat may be aided by the use of finely ground or mechanically separated meats, which provide an increased surface area for protein extraction and minimal interference from fat globules.

F. Humectant

The meat-based dough of the present invention may also include one or more humectants. In embodiments, the amount of humectant may range up to about 20% by weight, generally from about 2% by weight to about 15% by weight, based upon the weight of the meat-based dough.

Humectant sugars that may be employed include sucrose, fructose, lactose, dextrose, maltose, galactose, sorbose, mannose, maple syrup, corn syrups, invert syrups, high fructose corn syrups, honey, molasses, as well as mixtures of one or more of the foregoing humectants.

Other humectants or aqueous solutions of humectants which are not sugars may also be employed in the meat-based doughs. For example, glycerol; sugar alcohols such as mannitol, maltitol, xylitol, and sorbitol; and other polyols, may be used. Additional examples of humectant polyols (i.e., polyhydric alcohols) include humectant glycols, for example, propylene glycol and hydrogenated glucose syrups. Other humectants include sugar esters, dextrins, hydrogenated starch hydrolysates, and other starch hydrolysis products. In preferred embodiments of the present invention, sucrose and propylene glycol are employed in the meat-based doughs.

G. Filler

The meat-based dough may also include a filler. Components such as plant matter including farinaceous material, for example, rice flour, oat fiber, wheat middling, soy flour, wheat germ, corn grits, soy grits, wheat gluten, textured soy protein, soy isolates, soy concentrates, albumin, and mixtures thereof may be employed as fillers. Exemplary filler amounts range up to about 15% by weight, generally from about 1% by weight to about 10% by weight, based upon the weight of the dough.

H. Seasonings and Flavorings

Seasonings and flavorings may be employed in amounts up to about 10% by weight, based upon the weight of the meat-based dough. Exemplary seasoning and flavorings that may be included in the dough of the present invention include at least one of: (1) spices, for example, garlic, cloves, onion, chili pepper, black pepper, sweet basil, bay leaf, marjoram, parsley, sage, rosemary and thyme, (2) flavored foodstuffs, for example, cheese, cheese bits, cheese powder, eggs, egg bits, egg powder, bacon, bacon bits, and bacon powder, (3) flavorings such as bacon flavoring, fish flavoring, poultry flavoring, liquid smoke flavoring and/or airborne smoke, and (4) flavor enhancers such as monosodium glutamate.

I. Preservatives and Other Ingredients

Preservatives and curing agents in amounts of up to about 5% by weight, generally from about 0.05% by weight to about 3% by weight, of the meat-based dough can be utilized. Vitamin and mineral supplements can also be included in the doughs in exemplary amounts of up to about 2% by weight of the meat-based dough.

Examples of one or more preservatives and curing agents are benzoic acid, the sodium and other salts of benzoic acid, the sodium, calcium and other salts (propionates) of propionic acid, sorbic acid, the potassium, calcium, sodium and other salts (sorbates) of sorbic acid, diethyl pyrocarbonate and menadione sodium bisulfate, and sodium nitrite (cure). Potassium sorbate and sodium nitrite are preferred.

An acidic substance is preferably added in conjunction with any addition of the sorbate salts and the like to raise the acidity which enhances the actions of the sorbate salts and the like. The preferred acidic substance for this purpose is generally lactic acid because the final product exhibits enhanced flavor. Other acids which may be used include edible organic acids such as citric acid and fumaric acid. Exemplary amounts of the acidic substance range from about 0.25% by weight to about 0.75% by weight, based upon the weight of the meat-based dough.

Minor amounts of antioxidants can optionally be used in the meat-based doughs of the present invention. Examples of antioxidants are butylated hydroxytoluene (BHT), butylated hydroxyanisole (BHA), propyl galate and ascorbyl palmitate. In embodiments, the amount of antioxidant may be up to about 1% by weight, preferably about 0.01% by weight, based upon the weight of the meat-based dough. The antioxidant can also be placed on the interior surface of a packaging material.

II. Method of Making Strip-Shaped Food Products

The meat-based doughs may be prepared by comminuting or grinding completely frozen, substantially frozen, or unfrozen meat to obtain comminuted meat. A process flow chart illustrating an embodiment for producing a rotary molded jerky product according to the present invention is shown in FIG. 1. Conventional apparatus for producing rotary-molded jerky products may be employed, such as the apparatus disclosed in U.S. Pat. No. 5,731,029 to Karwowski et al., which is herein incorporated by reference in its entirety.

As shown in FIG. 1, frozen blocks of meat 1 may be ground in a conventional meat grinder 5. The meat grinder 5 may comprise a hopper for feeding the blocks of frozen raw meat 1 to a grinding plate.

The at least substantially ground frozen meat may then be conveyed to a cooker 10. The ground frozen meat may enter the cooker 10 at a temperature of about 25° F. to about 32° F. The at least substantially ground frozen meat may be heated at temperatures to at least partially denature the protein of the meat. Exemplary cooking temperatures may range from about 140° F. to about 185° F., preferably from about 150° F. to about 165° F. Exemplary cooking times may range from about 10 minutes to about 40 minutes, preferably from about 20 minutes to about 35 minutes. The cooking is preferably conducted at about atmospheric pressure although subatmospheric and superatmospheric pressures may be used. Broken food products may be added to the cooker via a recycle stream 15. According to the present invention, salt 20 may be optionally added during cooking of the meat.

The cooked meat may then be transferred from the cooker 10 to a surge hopper 25 where liquid ingredients 30 may be added to the cooked meat. In embodiments, propylene glycol, liquid smoke, and liquid lactic acid may be added to the cooked meat in the surge hopper.

The cooked meat may then be transferred to a vacuum cooler 35. The cooling should be sufficient to remove water and to at least partially solidify the fat that melts during cooking. Generally, the cooked meat is cooled to temperatures of less than about 120° F., preferably less than about 110° F., and more preferably to about 100° F., and takes about 30 minutes to about an hour. The vacuum pulls additional water out of the cooked meat. In embodiments, the pressure may be about 25-30 mm Hg, preferably about 26-27 mm Hg. The cooled, ground meat may then be fed to a mixer 45 via pump 40.

Dry ingredients may be admixed with the cooked meat during or after cooling of the cooked meat. In embodiments of the present invention, the dry ingredients may be admixed with the partially cooled meat, and then cooling and mixing may be continued to obtain at least substantial homogeneity and a dough-like consistency for sheeting and rotary molding. The rotary molding may be performed without sheeting as well.

The dry ingredients may be added separately or together to the cooked meat. The dry ingredients aid stability and helps reduce stickiness. The fat at least substantially solidifies upon addition of the dry ingredients. In embodiments of the present invention, one or more of the binding agent, humectant, seasonings/flavorings, preservative, and antioxidant are combined in preblend 50 and fed to hopper 55. The wheat flour and/or the filler may be included in the preblend 50. Alternatively, the wheat flour and/or filler 60 may be added separately to hopper 65. A coloring agent 70 and curing agent 75 may be added separately to the mixer 45 before adding the preblend 50.

Mixing of the cooled meat and ingredients in the mixer may be continued so as to obtain an at least substantially homogeneous meat-based dough. In a preferred embodiment, the mixture of meat and dry ingredients in mixer 45 is mixed for about 5-10 minutes and further cooled to a temperature of about 80-90° F. The mixer may be operated at any speed that forms an at least substantially homogeneous meat-based dough of the proper consistency and which is not too viscous. In embodiments, the mixer may operate at a speed of about 15 to about 25 rpm.

Figure 2:
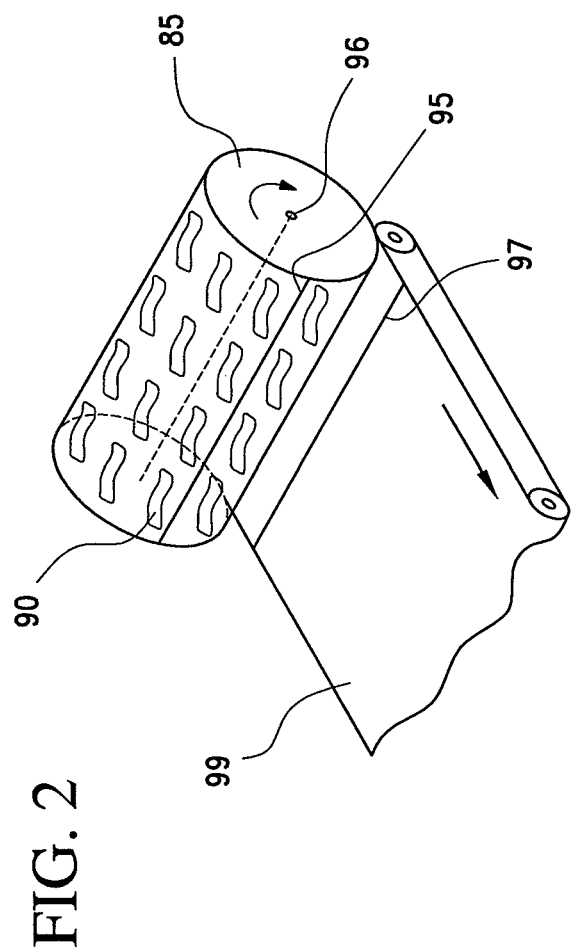
FIG. 2 schematically shows a rotary molding die roll according to the present invention having a plurality of angled die cups positioned about its peripheral surface.
Figure 3A:
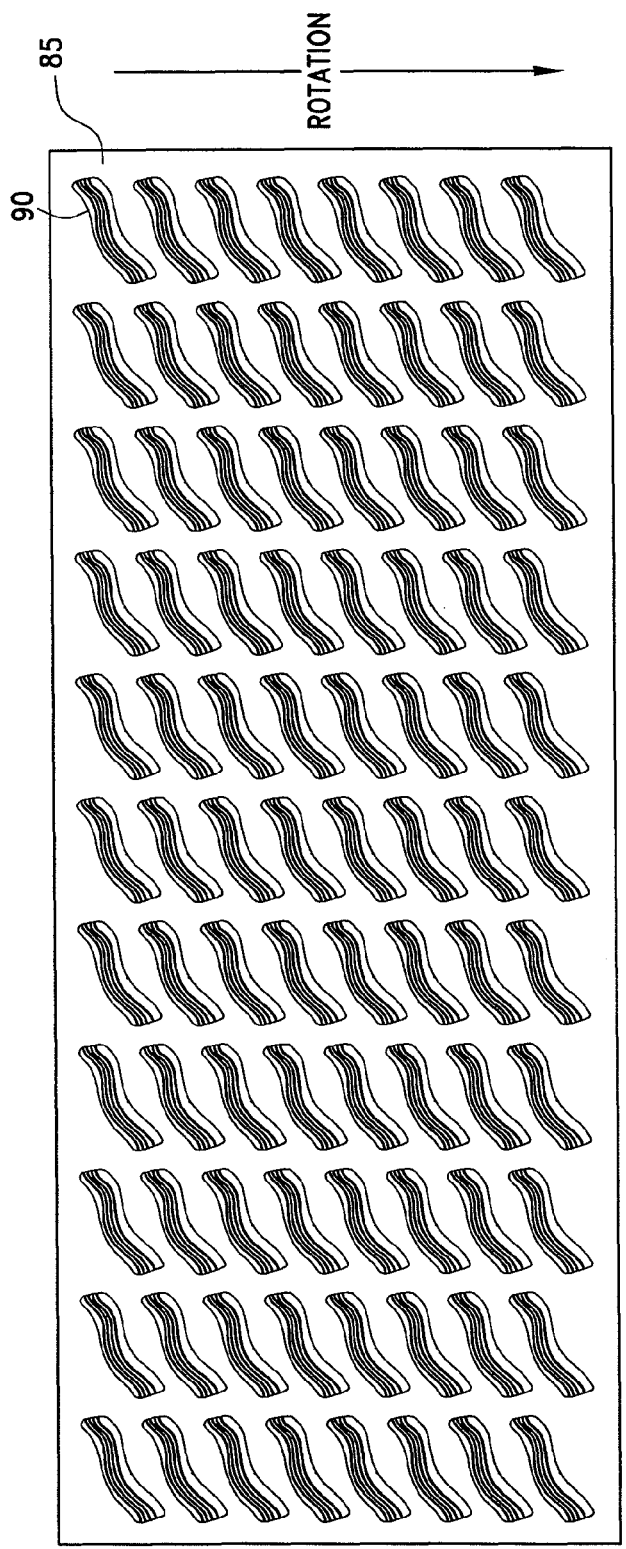
FIG. 3A schematically shows the configuration of wavy strip-shaped die cavities on the periphery of a rotary die roll.

The meat-based dough of the present invention may then be formed into individual pieces by rotary molder 80. Commercially available rotary molders may be used in the apparatus of the present invention, such as those produced by Weidenmuller Co., Morton Grove, Ill. The rotary molding apparatus generally comprises a rotating feeding drum. Positioned adjacent to and in peripheral contact with the rotating feeding drum is a rotary molding die roll 85. The rotary molding die roll is provided with a plurality of die cups 90 or molding cavities positioned in a particular arrangement about its peripheral surface, as shown in FIG. 2 and FIG. 3A. The die cups and respective molded dough pieces may have a length of about 6 to about 15 centimeters, preferably about 9 to about 12 centimeters, for example about 9.4 centimeters; a width of about 1 to about 4 centimeters; preferably about 2 to about 3 centimeters, for example about 2.5 centimeters; and a thickness of about 3 to about 7 millimeters, preferably about 4 to about 5 millimeters, for example about 4.5 millimeters. The molded pieces may have a length-to-width ratio of greater than about 1.5:1, for example, about 3.5:1 to about 4.5:1, and a length-to-thickness ratio of greater than about 8.5:1, for example, about 20:1 to about 30:1.

Figure 3B:
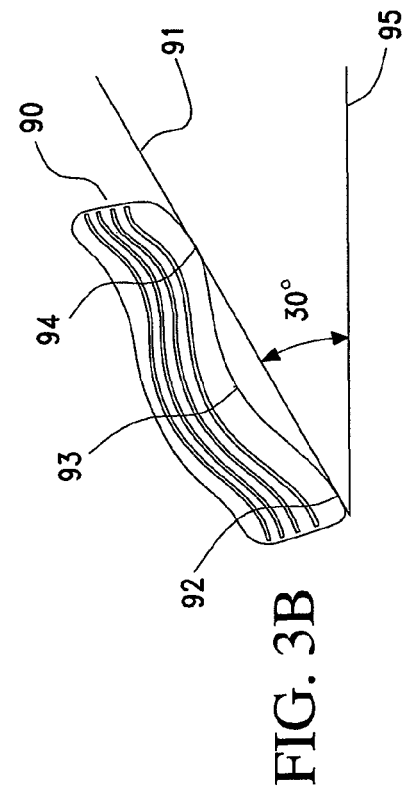
FIG. 3B schematically shows the angled configuration of a die cup for a wavy strip-shaped product.

In embodiments, the die cups 90 may be angled as shown in FIGS. 2, 3A, and 3B. A tangent line 91 from a front portion 92 of a longitudinal leading edge 93 of a strip or die cup 90 to a trailing portion 94 of the longitudinal leading edge 93 of the strip or die cup 90 is at an angle of about 5° to about 90° relative to an outer surface line 95 which is parallel to the central longitudinal axis 96 of the rotary molding die roll 85 or to the transverse axis 97 of a conveyor belt 99 or oven band upon which the strip is deposited from the die cup. Preferably, the tangent line from a front portion of the leading edge of a strip to a trailing portion of the leading edge of the strip is at an angle of about 10° to about 60°, more preferably at an angle of about 20° to about 40°, for example 30° as shown in FIG. 3B, relative to the surface longitudinal axis of the rotary molding die roll or transverse axis of the conveyor belt. At an angle of 90°, the tangent line is perpendicular to the transverse axis of the conveyor belt or oven band upon which the strip is deposited from the die cup. However, the dough may tend to curl up if a 90° angle die cup is used and the dough is too soft. So generally an angle of less than 90° is employed so that the dough piece is initially peeled from the die cup by its corner or end.

The angled die cups allow for less strain on the dough strip during rotary molding because the dough strip is lifted from a corner of the strip and peeled off of the die roll. The angled die cups allow for easier extraction of the food products from the die cavities. Consequently, there are less weak spots in the rotary-molded food products during drying and less breakage during packaging. Without the angle, once a portion of a dough strip starts to be pulled or released from a die cup, the entire dough strip tends to immediately fall out rather than being pulled out along its length. Thus, the dough may fall out of the die cups prematurely prior to the conveyor belt or may fall out of the die cups onto the conveyor belt or apron, thereby producing misshaped products.

The individual pieces may be transferred from the rotary molder 80 to oven 98. Upon baking, the molded pieces shrink. Conventional baking ovens may be used for baking the rotary molded pieces. Multi-zoned band ovens which are gas fired and are equipped with top and bottom heating means are preferred. The baking oven is preferably equipped with a continuous open mesh band. The baking of the individual pieces may be at a temperature of about 200-300° F. In embodiments, the oven 98 may have nine heating zones with zones 1-3 at a temperature of about 220-240° F. and zones 4-9 at a temperature of about 250-270° F. In a preferred embodiment, the rotary-molded pieces may be in the oven for about 10-20 minutes, more preferably about 12-15 minutes, after which the molded pieces may be transferred to drier 105. A control point 100 may be located between oven 98 and drier 105, for example, to measure the color of the baked pieces.

Drying may be performed in a conventional dryer, such as a continuous belt dryer or oven, and the like. Drying temperatures generally range from about 200° F. to about 235° F., preferably about 210° F. Drying times generally range from about 10 minutes to about 60 minutes, preferably from about 30 minutes. The dried product may be packaged by any conventional packaging equipment 115, for example, in cardboard boxes or in moisture-proof bags. A control point 110 may be located between drier 105 and packaging equipment 115, for example, to measure water activity of the dried pieces.

III. Final Product

In embodiments, the final food product of the present invention may contain at least about 15% by weight, preferably at least about 20% by weight, of meat, based upon the weight of the rotary-molded strip shaped product. The food product may also contain about 5% by weight to about 60% by weight of wheat flour, based upon the weight of the rotary-molded, strip-shaped product.

Figure 4A:
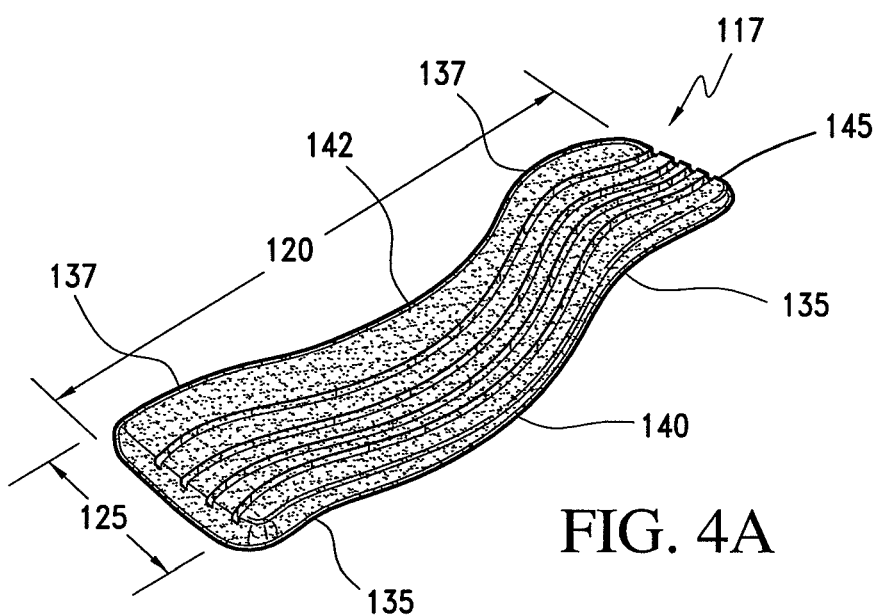
FIGS. 4A and 4B schematically show a rotary-molded, strip-shaped food product according to the present invention having a wavy shape.
Figure 4B:
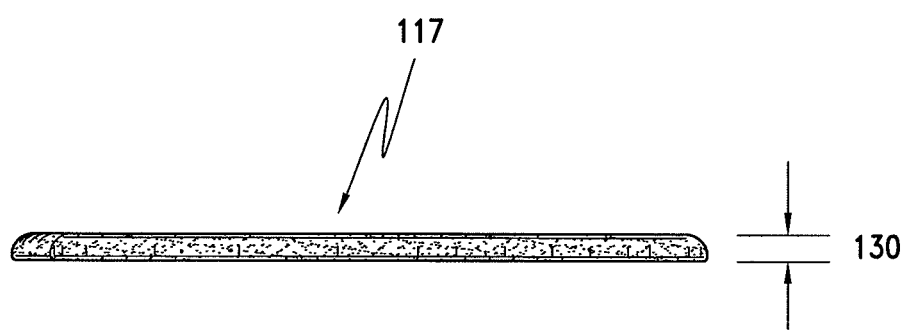

The rotary-molded food products of the present invention may be produced as a straight strip or as a wavy or undulating strip 117, shown in FIGS. 4A and 4B. The wavy strip 117 has a length 120, a width 125, and a thickness 130. The wavy strip may have one or more concave portions 135 on one side and corresponding convex portions 137 on an opposing side. Similarly, the wavy strip may have one or more convex portions 140 on one side and corresponding concave portions 142 on an opposing side. The wavy strip may also have one or more recessed portions 145 along its surface. Different strip shapes may be produced simultaneously by using variously shaped molds or cavities upon a single die roll. Further, the pieces may be embossed or impressed with a logo or design contained in the cavities or molds of the die roll. The baked food products may have a length of about 5 to about 15 centimeters, for example about 9.5 centimeters; a width of about 1 to about 3 centimeters, for example about 2.5 centimeters; and a thickness of about 3 to about 6 millimeters, for example about 3.5 millimeters.

The final moisture content of the pieces may be less than or equal to about 30% by weight, preferably less than about 20% by weight, based upon the weight of the final meat-based product. Exemplary final moisture contents may range from about 15% by weight to about 30% by weight, preferably from about 16% by weight to about 22% by weight, based upon the weight of the final meat-based product. In preferred embodiments, the pieces are baked to reduce the moisture content of the pieces to about 25% by weight to about 35% by weight, based upon the weight of the pieces. The baked pieces may then be dried in a dryer to reduce the moisture content to about 16% to about 22% by weight, based upon the weight of the final product.

The final rotary-molded, strip-shaped molded products of the present invention may have a water activity of less than about 0.8, preferably less than about 0.75, and generally from about 0.65 to about 0.75. Products having a water activity greater than about 0.7 preferably contain a preservative or antimycotic to assure microbial shelf stability. The products of the present invention exhibit shelf stability under unrefrigerated conditions of at least about 6 months, preferably at least about 12 months in proper moisture proof packaging, such as foil-lined bags.

The present invention is further illustrated by the following examples wherein all parts, percentages and ratios are by weight, all pressures are atmospheric, and all temperatures are in ° F. unless indicated to the contrary:

EXAMPLES

A. Examples 1-3 and Comparative Examples 1-2

Examples 1-3 were made according to embodiments of the present invention. Table 1 shows the compositions of Examples 1-3 compared to the compositions of (1) the pet food product disclosed in Example 4 of U.S. Pat. No. 5,731,029 to Karwowski et al. (Comparative Example 1), and (2) jerky strips without wheat flour (Comparative Example 2):

TABLE 1

| Ingredients | Comparative Ex. 1 (EXAMPLE 4 U.S. Pat. No. 5,731,029) wt % | Comparative Ex. 2 No Flour wt. % | Example 1 4.3% Wheat flour wt. % | Example 2 36.6% Wheat flour wt. % | Example 3 20% Wheat flour wt. % |
|---|---|---|---|---|---|
| Sucrose* | 11.08 | 12.328 | 11.833 | 7.402 | 11.0 |
| Cold-Water-Soluble Starch | 7.05 | 6.468 | 6.21 | 2.775 | 7.05 |
| Oat Fiber* | 0 | 2.157 | 2.958 | 2.960 | 0 |
| Wheat Middlings* | 0 | 2.774 | 0.592 | 0 | 0 |
| Rice Flour* | 0 | 1.849 | 0.592 | 0 | 0 |
| Salt* | 2.014 | 1.849 | 1.775 | 1.480 | 2.01 |
| Gum* | 1.007 | 0.925 | 0.976 | 1.110 | 1.01 |
| Garlic Powder* | 0.604 | 0.562 | 0.592 | 0.370 | 0.60 |
| Potassium Sorbate* | 0.161 | 0.148 | 0.147 | 0.119 | 0.16 |
| Antioxidant* | 0.002 | 0.002 | 0.002 | 0.0011 | 0.002 |
| Bacon Fat* | 0 | 0 | 0 | 1.295 | 0 |
| Dextrose* | 1.611 | 0 | 0 | 0 | 1.61 |
| Soy Grits | 12.6 | 13.321 | 14.899 | 0 | 0 |
| Ground Beef | 0 | 27.094 | 25.911 | 0 | 0 |
| Emulsified Chicken Meat | 58.93 | 27.094 | 25.911 | 43.375 | 51.53 |
| Wheat Flour | 0 | 0 | 4.318 | 36.615 | 20 |
| Smoke Flavor | 0.76 | 1.388 | 1.33 | 0.813 | 0.76 |
| Propylene Glycol | 1.51 | 1.388 | 1.33 | 1.113 | 1.51 |
| Liquid Lactic Acid | 0.5 | 0.555 | 0.531 | 0.445 | 0.5 |
| Cure | 0.16 | 0.075 | 0.073 | 0.061 | 0.16 |
| Color | 0 | 0.020 | 0.0194 | 0.067 | 0 |
| Brown Sugar | 2.01 | 0 | 0 | 0 | 2.01 |
| TOTAL | 100 | 100 | 100 | 100 | 100 |

*PREBLEND

The products of Examples 1-3 and Comparative Examples 1-2 were made by first grinding frozen meat (chicken and/or beef). The at least substantially ground frozen meat was then cooked for about 35 minutes at a temperature of about 160° F. The cooked meat was then transferred from the cooker to a surge hopper, where propylene glycol, liquid smoke, and liquid lactic acid were added.

The cooked meat was then transferred to a vacuum cooler and cooled to a temperature of about 120° F. at a pressure of about 26-27 mm Hg. The cooled, ground meat was subsequently fed to a mixer via a shear pump. A coloring agent and sodium nitrite curing agent were added separately to the mixer.

For Example 1 and Comparative Example 2, a preblend was made comprising sucrose, MIRAGEL® 463, oat fiber, rice flour, wheat middlings, guar gum, garlic powder, potassium sorbate, BHA antioxidant, and salt. For Example 2, a preblend was made containing sucrose, MIRAGEL® 463, oat fiber, guar gum, garlic powder, potassium sorbate, BHA antioxidant, bacon fat, and salt. For Example 3 and Comparative Example 1, a preblend was made containing sucrose, MIRAGEL® 463, guar gum, garlic powder, potassium sorbate, BHA antioxidant, and salt. Each preblend was combined in a hopper with a mixture of certified wheat flour and/or soy grits and then added to the mixer. Mixing of the cooled meat and ingredients was at a temperature of about 80° F. and for about 5 minutes and at a speed of 15 rpm to form a dough.

The dough was then rotary-molded using a conventional rotary molder operated at a speed of about 5-7 rpm. The individual dough pieces were transferred from the rotary molder to a multi-zone band oven having 9 heating zones (zones 1-3 at a temperature of about 235° F. and zones 4-9 at a temperature of about 265° F.). The individual pieces were baked in the oven for about 13-14 minutes. The baked pieces were then transferred to a drier and dried at a temperature of about 210° F. for about 30 minutes.

B. Effect of Wheat Flour Addition on Breakage

Breakage data was obtained according to the following methodology. For each of the pallets of production, up to 4 cases with up to 12 bags per case (i.e., up to 48 bags) were examined. The whole pieces in each bag were counted. The pallet was deemed acceptable if (1) a minimum of 38 of the 48 bags contain 10 or more whole pieces (or about 80% contain 10 or more whole pieces), and (2) of the remaining 10 bags, 8 bags (or about 16%) contain 9 whole pieces and 2 bags (about 4%) contain 8 whole pieces.

Breakage was defined as greater than 25% loss off either end of a piece.

Table 2 shows breakage data for Example 1. Table 3 shows breakage data for Comparative Example 2.

TABLE 2

BREAKAGE DATA FOR EXAMPLE 1

| Pallet | 1 | 2 | 3 | 4 | 5 | 6 |
|---|---|---|---|---|---|---|
| Pass/Fail | Pass | Pass | FAIL | Pass | Pass | Pass |
| Culled? | No | No | No | Yes | Yes | Yes |
| Cases | 4 | 102 | 102 | 102 | 102 | 18 |
| BAG | NUMBER OF WHOLE PIECES PER BAG | | | | | |
| 1 | 10 | 10 | 10 | 10 | 11 | 11 |
| 2 | 11 | 11 | 11 | 11 | 11 | 12 |

TABLE 2-continued

BREAKAGE DATA FOR EXAMPLE 1

| Pallet | 1 | 2 | 3 | 4 | 5 | 6 |
|---|---|---|---|---|---|---|
| 3 | 10 | 11 | 10 | 11 | 11 | 12 |
| 4 | 10 | 11 | 10 | 10 | 11 | 12 |
| 5 | 11 | 10 | 10 | 11 | 11 | 11 |
| 6 | 12 | 11 | 11 | 11 | 12 | 11 |
| 7 | 12 | 10 | 11 | 12 | 11 | 12 |
| 8 | 11 | 11 | 10 | 11 | 11 | 11 |
| 9 | 11 | 12 | 10 | 12 | 12 | 12 |
| 10 | 9 | 11 | 10 | 11 | 11 | 12 |
| 11 | 9 | 10 | 10 | 11 | 12 | 12 |
| 12 |  | 10 | 10 | 12 | 11 | 12 |
| 13 |  | 10 | 10 | 10 | 10 |  |
| 14 |  | 10 | 11 | 11 | 11 |  |
| 15 |  | 10 | 10 | 12 | 11 |  |
| 16 |  | 12 | 10 | 11 | 12 |  |
| 17 |  | 11 | 11 | 11 | 11 |  |
| 18 |  | 11 | 10 | 11 | 10 |  |
| 19 |  | 10 | 11 | 12 | 11 |  |
| 20 |  | 11 | 13 | 12 | 10 |  |
| 21 |  | 11 | 12 | 10 | 10 |  |
| 22 |  | 11 | 12 | 12 | 10 |  |
| 23 |  | 11 | 12 | 12 | 11 |  |
| 24 |  | 10 | 12 | 12 | 10 |  |
| 25 |  | 10 | 13 | 11 | 10 |  |
| 26 |  | 11 | 12 | 12 | 12 |  |
| 27 |  | 11 | 12 | 11 | 13 |  |
| 28 |  | 11 | 10 | 11 | 11 |  |
| 29 |  | 10 | 7 | 10 | 10 |  |
| 30 |  | 9 | 9 | 11 | 9 |  |
| 31 |  | 11 | 9 | 12 | 10 |  |
| 32 |  | 11 | 9 | 12 | 11 |  |
| 33 |  | 11 | 9 | 11 | 11 |  |
| 34 |  | 10 | 9 | 12 | 11 |  |
| 35 |  | 11 | 9 | 11 | 10 |  |
| 36 |  | 8 | 8 | 11 | 12 |  |
| 37 |  | 11 | 8 | 11 | 12 |  |
| 38 |  | 10 | 7 | 10 | 12 |  |
| 39 |  | 10 | 9 | 11 | 12 |  |
| 40 |  | 10 | 9 | 11 | 11 |  |
| 41 |  | 10 | 9 | 10 | 11 |  |
| 42 |  | 9 | 9 | 10 | 12 |  |
| 43 |  | 8 | 7 | 10 | 10 |  |
| 44 |  | 10 | 8 | 10 | 12 |  |
| 45 |  | 9 | 7 | 11 | 11 |  |
| 46 |  | 9 | 6 | 12 | 12 |  |
| 47 |  | 10 | 7 | 12 | 12 |  |
| 48 |  | 9 | 7 | 11 | 11 |  |

TABLE 3

BREAKAGE DATA FOR COMPARATIVE EXAMPLE 2

| Pallet | 1 | 2 | 3 | 4 | 5 | 6 | 7 | 8 | 9 | 10 |
|---|---|---|---|---|---|---|---|---|---|---|
| Pass/Fail | FAIL | FAIL | FAIL | FAIL | Pass | Pass | FAIL | FAIL | Pass | Pass |
| Culled? | Yes | Yes | Yes | Yes | Yes | Yes | Yes | Yes | Yes | Yes |
| Cases | 102 | 102 | 102 | 102 | 102 | 102 | 102 | 102 | 102 | 94 |
| Bag | \multicolumn{10}{c}{NUMBER OF WHOLE PIECES PER BAG} |
| 1 | 11 | 10 | 11 | 10 | 11 | 10 | 10 | 10 | 12 | 10 |
| 2 | 10 | 10 | 11 | 10 | 10 | 11 | 11 | 12 | 11 | 11 |
| 3 | 10 | 10 | 10 | 11 | 11 | 11 | 11 | 12 | 12 | 10 |
| 4 | 10 | 10 | 10 | 10 | 11 | 11 | 11 | 10 | 11 | 10 |
| 5 | 10 | 10 | 11 | 10 | 11 | 12 | 10 | 10 | 10 | 10 |
| 6 | 11 | 11 | 11 | 10 | 11 | 10 | 11 | 12 | 12 | 11 |
| 7 | 10 | 10 | 10 | 11 | 11 | 10 | 10 | 12 | 10 | 13 |
| 8 | 11 | 10 | 11 | 10 | 10 | 10 | 11 | 10 | 12 | 10 |
| 9 | 12 | 11 | 10 | 11 | 11 | 12 | 10 | 10 | 10 | 10 |
| 10 | 10 | 10 | 11 | 10 | 11 | 11 | 10 | 10 | 10 | 12 |
| 11 | 12 | 10 | 10 | 10 | 11 | 10 | 10 | 12 | 10 | 12 |
| 12 | 11 | 10 | 10 | 10 | 11 | 10 | 10 | 11 | 10 | 12 |
| 13 | 10 | 10 | 10 | 10 | 11 | 11 | 11 | 11 | 12 | 12 |
| 14 | 10 | 10 | 11 | 11 | 11 | 10 | 10 | 10 | 11 | 11 |
| 15 | 10 | 11 | 12 | 10 | 11 | 11 | 10 | 11 | 12 | 12 |
| 16 | 10 | 11 | 10 | 11 | 10 | 10 | 11 | 11 | 12 | 10 |
| 17 | 11 | 10 | 11 | 10 | 10 | 13 | 10 | 10 | 10 | 10 |
| 18 | 10 | 10 | 9 | 10 | 10 | 11 | 10 | 11 | 13 | 12 |
| 19 | 11 | 11 | 7 | 9 | 12 | 11 | 10 | 12 | 12 | 11 |
| 20 | 10 | 10 | 9 | 10 | 10 | 11 | 8 | 12 | 10 | 13 |
| 21 | 9 | 9 | 8 | 10 | 12 | 11 | 9 | 12 | 11 | 12 |
| 22 | 8 | 9 | 8 | 10 | 11 | 10 | 7 | 11 | 11 | 10 |
| 23 | 8 | 9 | 8 | 9 | 12 | 11 | 9 | 12 | 10 | 12 |
| 24 | 9 | 8 | 8 | 8 | 12 | 10 | 8 | 12 | 11 | 11 |
| 25 | 9 | 7 | 9 | 9 | 11 | 11 | 9 | 12 | 13 | 10 |
| 26 | 9 | 7 | 9 | 8 | 12 | 11 | 7 | 11 | 11 | 11 |
| 27 | 9 | 8 | 9 | 9 | 12 | 11 | 8 | 11 | 11 | 10 |
| 28 | 8 | 9 | 8 | 9 | 11 | 10 | 9 | 11 | 10 | 11 |
| 29 | 8 | 9 | 9 | 9 | 12 | 11 | 8 | 11 | 13 | 11 |
| 30 | 9 | 8 | 9 | 9 | 9 | 9 | 8 | 8 | 8 | 9 |
| 31 | 9 | 8 | 9 | 8 | 8 | 8 | 9 | 9 | 8 | 9 |
| 32 | 8 | 8 | 8 | 8 | 9 | 9 | 9 | 9 | 12 | 9 |
| 33 | 9 | 9 | 9 | 8 | 9 | 12 | 8 | 8 | 13 | 9 |
| 34 | 9 | 9 | 9 | 8 | 9 | 11 | 9 | 9 | 13 | 9 |
| 35 | 8 | 9 | 9 | 9 | 8 | 10 | 9 | 9 | 13 | 8 |
| 36 | 9 | 9 | 9 | 9 | 9 | 12 | 9 | 9 | 12 | 10 |
| 37 | 9 | 9 | 9 | 9 | 8 | 11 | 8 | 8 | 12 | 10 |
| 38 | 9 | 9 | 9 | 9 | 9 | 10 | 9 | 9 | 11 | 10 |

TABLE 3-continued

BREAKAGE DATA FOR COMPARATIVE EXAMPLE 2

| Pallet | 1 | 2 | 3 | 4 | 5 | 6 | 7 | 8 | 9 | 10 |
|---|---|---|---|---|---|---|---|---|---|---|
| 39 | 9 | 8 | 9 | 8 | 9 | 10 | 8 | 12 | 11 | 9 |
| 40 | 9 | 9 | 9 | 9 | 9 | 11 | 9 | 8 | 12 | 9 |
| 41 | 8 | 9 | 9 | 9 | 9 | 11 | 8 | 11 | 10 | 11 |
| 42 | 8 | 8 | 9 | 9 | 10 | 10 | 8 | 9 | 11 | 11 |
| 43 | 8 | 9 | 9 | 9 | 10 | 11 | 7 | 11 | 11 | 11 |
| 44 | 9 | 8 | 9 | 9 | 9 | 8 | 7 | 12 | 10 | 10 |
| 45 | 7 | 6 | 7 | 6 | 11 | 10 | 6 | 7 | 10 | 7 |
| 46 | 7 | 7 | 6 | 7 | 10 | 12 | 7 | 5 | 12 | 9 |
| 47 | 8 | 7 | 7 | 7 | 11 | 9 | 7 | 5 | 12 | 11 |
| 48 | 7 | 5 | 5 | 7 | 8 | 10 | 5 | 5 | 11 | 8 |

As shown by Tables 2-3, the product of Example 1 has substantially reduced breakage in comparison to the product of Comparative Example 2. The product of Example 1 (with 4.3% by weight of wheat flour based upon the weight of the dough) had only 1 failed run out of 6 runs (i.e., 16.7% failure). In contrast the product of Comparative Example 2 had 6 failed out of 10 runs (i.e., 60% failure). Even with product culling, the product of Comparative Example 2 repeatedly failed.

C. Effect of Wheat Flour and Salt Addition on Tensile Strength

The following Table 4 shows the compositions of food products made from a dough containing wheat flour or wheat gluten. Salt was added either in a preblend or directly at the cooker as indicated:

TABLE 4

| Ingredients | Control EXAMPLE 4 U.S. Pat. No. 5,731,029 Wt. % | Experimental A EXAMPLE 4 U.S. Pat. No. 5,731,029 NaCl @ cooker Wt. % | Experimental B 4% flour Wt. % | Experimental C 4% flour NaCl @ cooker Wt. % | Experimental D 4% wheat gluten NaCl @ cooker Wt. % | Experimental E 10% flour Wt.% |
|---|---|---|---|---|---|---|
| Salt (at cooker) | 0 | 2.01 | 0 | 2.01 | 2.01 | 0 |
| Soy Grits | 12.6 | 12.6 | 8.6 | 8.6 | 8.6 | 2.6 |
| Emulsified Chicken Meat | 58.93 | 58.93 | 58.93 | 58.93 | 58.93 | 58.93 |
| Wheat Flour | 0 | 0 | 4 | 4 | 0 | 10 |
| Wheat Gluten | 0 | 0 | 0 | 0 | 4 | 0 |
| Smoke Flavor | 0.76 | 0.76 | 0.76 | 0.76 | 0.76 | 0.76 |
| Propylene Glycol | 1.51 | 1.51 | 1.51 | 1.51 | 1.51 | 1.51 |
| Liquid Lactic Acid | 0.5 | 0.5 | 0.5 | 0.5 | 0.5 | 0.5 |
| Cure | 0.16 | 0.16 | 0.16 | 0.16 | 0.16 | 0.16 |
| Brown Sugar | 2.01 | 2.01 | 2.01 | 2.01 | 2.01 | 2.01 |
| Sucrose* | 11.08 | 11.08 | 11.08 | 11.08 | 11.08 | 11.08 |
| Cold-Water-Soluble Starch* | 7.05 | 7.05 | 7.05 | 7.05 | 7.05 | 7.05 |
| Salt* (in preblend) | 2.01 | 0 | 2.01 | 0 | 0 | 2.01 |
| Gum* | 1.01 | 1.01 | 1.01 | 1.01 | 1.01 | 1.01 |
| Garlic powder* | 0.60 | 0.60 | 0.60 | 0.60 | 0.60 | 0.60 |
| Potassium sorbate* | 0.16 | 0.16 | 0.16 | 0.16 | 0.16 | 0.16 |
| Antioxidant* | 0.002 | 0.002 | 0.002 | 0.002 | 0.002 | 0.002 |
| Dextrose* | 1.61 | 1.61 | 1.61 | 1.61 | 1.61 | 1.61 |
| TOTAL | 100 | 100 | 100 | 100 | 100 | 100 |

*PREBLEND

The compositions were made according to the process of the present invention described above for Examples 1-3. The Control composition is the composition disclosed in Example 4 of U.S. Pat. No. 5,731,029 to Karwowski et al. The Experimental A composition is the same as the Control, except salt is added at the cooker instead of in a preblend. The Experimental B composition is the same as the Control composition, except it contains 4% by weight of wheat flour, based upon the weight of the dough, and less soy grits. The Experimental C composition is the same as the Control composition, except it contains 4% by weight of wheat flour, based upon the weight of the dough, less soy grits, and salt is added at the cooker instead of in a preblend. The Experimental D composition is the same as the Control composition, except it contains 4% by weight of wheat gluten, based upon the weight of the dough, and less soy grits. The Experimental E composition is the same as the Control composition, except it contains 10% by weight of wheat flour, based upon the weight of the dough, and less soy grits.

The Control product and Experimental products A, B, C, D, and E as shown in Table 4 above were subjected to a tensile strength test. Hourglass-shaped samples were created by stamping food products of each composition to obtain a standard shape. The hourglass pieces were then pulled apart at each end. The force required to break the piece was measured (in gram-force) as well as the distance (in millimeters) deformed before the peak breakage force. The measured data is shown below in Table 5:

TABLE 5

|  | Control Example 4 U.S. Pat. No. 5,731,029 | Experimental A NaCl @ cooker | Experimental B 4% flour | Experimental C 4% flour NaCl @ cooker | Experimental D 4% wheat gluten NaCl @ cooker | Experimental E 10% flour |
|---|---|---|---|---|---|---|
| Number of samples | 43 | 24 | 35 | 50 | 37 | 29 |
| Average Max. Force, gram-force | 201.37 | 216.91 | 237.24 | 235.67 | 222.73 | 366.01 |
| % Increase in Avg. Max. Force | — | 7.7 | 17.8 | 17.3 | 10.6 | 81.8 |
| Standard deviation | 29.24 | 55.73 | 37.34 | 36.65 | 65.79 | 92.92 |
| Average Distance to Max. Force, mm | 3.52 | 2.29 | 3.32 | 3.50 | 2.72 | 4.09 |
| Standard deviation | 0.54 | 0.36 | 0.35 | 0.53 | 0.68 | 0.74 |

As shown in Table 5, food products made from a dough containing wheat flour (Experimental B, C, and E) showed an unexpectedly greater tensile strength as compared to: (1) the Control; (2) samples containing no wheat flour (Experimental A); and (3) samples containing wheat gluten (Experimental D). As the amount of wheat flour increased, the average maximum force required to break the piece increased, regardless of whether salt was added at the cooker or with a preblend after cooking. Also, food products made with salt addition at the cooker, with or without flour addition (Experimental A, C, and D), showed a directional increase in tensile strength as compared to the Control where salt was added in a preblend after cooking without flour addition.

D. Effect of Wheat Flour on Flexibility

The Control product and Experimental E product were subjected to a 3-point bend test to examine flexibility. Each sample was cut in half to yield two pieces about 50 mm long and 21 mm wide. Each piece was placed on sample supports and deformed by a rounded blade driven down into the sample midway between the supports. Test conditions were as follows:
Support (sample) length: 30 mm;
Test speed (speed blade driven into sample): 1 mm/sec;
Blade and sample supports: 3 mm thick, round edges; and
Test distance (how far the blade was driven into the sample, or pushed the sample down between the supports): 15 mm.

The maximum force to deform or break the piece was measured (in gram-force) as well as the distance (in millimeters) deformed at the peak force. The force at 14 mm distance was also recorded and expressed as a percent of the maximum force to indicate the relative amount of structure remaining near the maximum test distance. The measured data is shown below in Table 6:

TABLE 6

|  | Control Example 4 U.S. Pat. No. 5,731,029 | Experimental E 10% flour |
|---|---|---|
| Number of Samples | 20 | 20 |
| Max. Force, gram-force | 110.56 | 127.48 |
| % Inc. in Max. Force | — | 15.3 |
| Standard Deviation | 17.05 | 25.17 |
| Distance at Max. Force, mm | 6.66 | 8.38 |
| Standard Deviation | 0.64 | 1.20 |
| % of Max. Force at 14 mm Deformation | 5.3 | 44.8 |
| % of Max. Force Standard Deviation | 6.6 | 21.8 |

As shown in Table 6, food products made from a dough containing wheat flour (Experimental E) showed an unexpectedly greater flexibility as compared to the Control product.

E. Effect of Salt Addition on Water Activity

1. Non-Wheat Flour Containing Pieces

The Control product and Experimental A product as shown in Table 4 were tested to determine changes in water activity ($A_w$) due to the addition of salt at the cooker. Water activity is relative humidity expressed in decimal form. As shown in Table 7, the addition of salt at the cooker unexpectedly increased water activity of a dry, rotary-molded piece by about 9-10% comparted to the Control where salt was added in a preblend after cooking:

TABLE 7

|  | Green weights | Post Dryer Weights | $A_w$ |
|---|---|---|---|
| Control | 4.10 oz | 3.20 oz | 0.699 |
| Experimental A | 5.30 oz | 3.20 oz | 0.770 |

2. Pieces Containing Wheat Flour

Four batches of Experimental F product as shown in the following Table 8 were produced as in Examples 1-3 to determine the effect of salt addition on the water activity of the resulting pieces. In two of the batches (Experimental F1 and F2), salt was added at the cooker. In the other two batches (Experimental F3 and F4), salt was added after cooking at the mixer in a preblend with other ingredients:

TABLE 8

| Ingredients | Experimental F1/F2 40% flour Weight % | Experimental F3/F4 40% flour Weight % |
|---|---|---|
| Beef | 21.88 | 21.88 |
| Chicken | 21.88 | 21.88 |
| Wheat Flour | 37.01 | 37.01 |
| Smoke Flavor | 0.82 | 0.82 |
| Propylene Glycol | 1.12 | 1.12 |
| Liquid Lactic Acid | 0.45 | 0.45 |
| Cure | 0.06 | 0.06 |
| Color | 0.07 | 0.14 |
| Salt (at cooker) | 1.82 | 0.00 |
| Sugar* | 6.35 | 6.35 |
| Oat Fiber* | 2.7 | 2.7 |
| Cold-Water-Soluble Starch* | 2.54 | 2.54 |
| Salt* (in preblend) | 0.00 | 1.82 |
| Gum* | 0.95 | 0.95 |
| Garlic powder* | 0.32 | 0.32 |
| Potassium sorbate* | 0.11 | 0.11 |
| Antioxidant* | 0.017 | 0.017 |

*PREBLEND

The oven temperatures, oven time, dryer time, and dryer temperatures were the same for each batch. The amount of colorant was doubled in Experimental F3/F4 due to bleaching out of the color from the wheat flour. The measured water activity is shown below in Table 9:

TABLE 9

| | Green Weights | Post Oven Weights | Post Dryer Weights | $A_w$ |
|---|---|---|---|---|
| Experimental F1 (salt at cooker) | 5.30 oz | 4.50 oz | 3.85 oz | 0.755 |
| Experimental F2 (salt at cooker) | 5.30 oz | 4.45 oz | 4.00 oz | 0.723 |
| Experimental F3 (salt in preblend) | 5.10 oz | 4.50 oz | 3.95 oz | 0.671 |
| Experimental F4 (salt in preblend) | 5.30 oz | 4.60 oz | 3.85 oz | 0.687 |

As shown in Table 9, the addition of salt at the cooker unexpectedly increased water activity of a dry, rotary-molded piece made from a dough containing about 40% by weight of wheat flour, based upon the weight of the dough, by about 6-7%.

The difference in water activity of the four batches of Experimental F was maintained after 1 month (e.g., 30 days) of shelf-life, stored in bulk in cardboard boxes with plastic liners and without moisture barrier protection. After 1 month, the water activity of each batch was calculated and is shown in Table 10. As a result of the higher water activity, a moister, chewy food product is obtained.

TABLE 10

| Location of Salt Addition | $A_w$ |
|---|---|
| Experimental F1 (salt at cooker) | 0.772 |
| Experimental F2 (salt at cooker) | 0.758 |
| Experimental F3 (salt in preblend) | 0.712 |
| Experimental F4 (salt in preblend) | 0.724 |

What is claimed is:

1. A baked chicken jerky food product, comprising:
   at least about 15% by weight of meat comprising chicken, based upon the weight of the food product;
   from about 5% to about 60% by weight of wheat flour, based upon the weight of the food product,
   a binding agent comprising a cold-water-soluble starch, and an alginate gum, and
   at least one ingredient selected from the group consisting of a humectant, an acidic substance, and combinations thereof,
   wherein the food product is in the form of a flexible, rotary-molded piece, and the meat is cooked to at least partially denature the meat protein before mixing with the wheat flour to form a rotary moldable dough.

2. A food product according to claim 1, wherein the meat is chicken.

3. A food product according to claim 1, which is baked from a dough comprising from about 0.5% by weight to about 3% by weight of the alginate gum, based upon the weight of dough.

4. A food product according to claim 1, which is baked from a dough comprising from about 1% to about 20% by weight of the cold-water-soluble starch, based upon the weight of the dough.

5. A food product according to claim 1, wherein the food product has a water activity of from about 0.65 to about 0.75.

6. A food product according to claim 1, wherein the flexible rotary molded piece can be bent so that opposing ends of the piece touch each other without breakage of the piece.

7. A food product according to claim 1, wherein the food product is a strip-shaped pet snack.

8. A food product according to claim 1 wherein the flexible rotary molded piece is a strip-shaped food product having a wavy shape.

9. A food product according to claim 1 wherein the flexible rotary molded piece has a length-to-width ratio of greater than about 1.5:1 and a length-to-thickness ratio of greater than about 8.5:1.

10. A food product according to claim 1 wherein the flexible rotary molded piece has a length-to-thickness ratio of about 20:1 to about 30:1.

11. A food product according to claim 1, wherein the flexible rotary molded piece has a length-to-width ratio of greater than about 1.5:1 and a length-to-thickness ratio of greater than about 8.5:1, and the flexible food product can be bent so that opposing ends of a piece touch each other without breakage of the piece.

12. A food product according to claim 11 wherein the flexible rotary molded piece is a strip-shaped food product having a wavy shape, and the flexible rotary molded piece has a length-to-thickness ratio of about 20:1 to about 30:1.

13. A food product according to claim 11 wherein the flexible rotary molded piece has a post-packaging average breakage per package of about 0.1% to about 0.5%, and said flexibility is maintained over a period of about 3 to about 4 months.

14. A food product according to claim 1 wherein the cooking of the meat to at least partially denature the meat protein is conducted at a temperature of from about 140° F. to about 185° F. for about 10 minutes to about 40 minutes.

15. A method of making a baked chicken jerky food product, comprising:
   (a) comminuting raw meat comprising chicken;
   (b) cooking the comminuted raw meat to at least partially denature the meat protein;
   (c) cooling the cooked meat;
   (d) admixing the cooled meat with wheat flour, a binding agent comprising a cold-water-soluble starch and an alginate gum, and at least one ingredient selected from the group consisting of a humectant, an acidic substance, and combinations thereof to obtain a dough, wherein the dough comprises about 4% by weight to about 45% by weight of wheat flour, at least about 35% by weight of the cooked meat, and up to about 25% by weight of the binding agent, based upon the weight of the dough;

(e) rotary molding the dough to form a plurality of individual pieces;

(f) baking the individual pieces; and (g) drying the baked, individual pieces to form a flexible, food product.

16. A method of making a food product according to claim 15, wherein the binding agent comprises from about 0.5% by weight to about 3% by weight of the alginate gum, based upon the weight of dough.

17. A method of making a food product according to claim 15, wherein about 1% to about 20% by weight, based upon the weight of the dough, of the cold-water-soluble starch is added to the cooked meat.

18. A method of making a food product according to claim 15, further comprising:

adding dry ingredients to the cooked meat, wherein the dry ingredients are in the form of a preblend, the preblend comprising at least one dry ingredient selected from the group consisting of a binding agent, a humectant, a seasoning, a preservative, and an antioxidant, and adding at least one filler to the cooked meat, wherein said at least one filler is selected from the group consisting of rice flour, oat fiber, and wheat middlings.

19. A method of making a food product according to claim 15, wherein the cooling is conducted under a vacuum.

20. A method of making a food product according to claim 15, wherein the dough comprises about 35% to about 75% by weight of meat, based upon the weight of the dough, and about 10% by weight to 40% by weight of wheat flour, based upon the weight of the dough.

21. A method of making a food product according to claim 20 wherein the dough comprises about 30% by weight to about 38% by weight of wheat flour, based upon the weight of the dough.

22. A method of making a food product according to claim 15, wherein the food product is a strip-shaped pet snack.

23. A method of making a food product according to claim 15 wherein the flexible food product can be bent so that opposing ends of a piece touch each other without breakage of the piece.

24. A method of making a food product according to claim 23, wherein the flexible rotary molded piece has a length-to-width ratio of greater than about 1.5:1 and a length-to-thickness ratio of greater than about 8.5:1.

25. A method of making a food product according to claim 15, wherein the cooking of the comminuted raw meat to at least partially denature the meat protein is conducted at a temperature of from about 140° F. to about 185° F. for about 10 minutes to about 40 minutes.

26. A dough for producing a baked, flexible, rotary molded pet food, said dough comprising:

a) cooked, comminuted raw meat comprising chicken in an amount of about 35% to about 75% by weight of meat, based upon the weight of the dough, b) about 10% by weight to 40% by weight of wheat flour, based upon the weight of the dough, c) a binding agent comprising a cold-water-soluble starch in an amount of about 1% to about 20% by weight, based upon the weight of the dough, and from about 0.5% by weight to about 3% by weight of an alginate gum, based upon the weight of dough, d) at least one filler in an amount of up to about 15% by weight of the dough, and e) at least one ingredient selected from the group consisting of a humectant, an acidic substance, and combinations thereof, wherein the raw meat is cooked to at least partially denature the meat protein before mixing with the wheat flour, and said dough is rotary moldable into individual pieces which may be baked into flexible, rotary molded, pet food pieces.

27. A dough according to claim 26 wherein said at least one filler is selected from the group consisting of rice flour, oat fiber, and wheat middlings.

28. A dough according to claim 26 wherein the cooking of the raw meat to at least partially denature the meat protein is conducted at a temperature of from about 140° F. to about 185° F. for about 10 minutes to about 40 minutes.

* * * * *